March 5, 1935.　　C. E. JOHNSON　　1,992,952
MACHINE FOR SPLITTING SOLES
Filed Sept. 14, 1931　　4 Sheets-Sheet 2
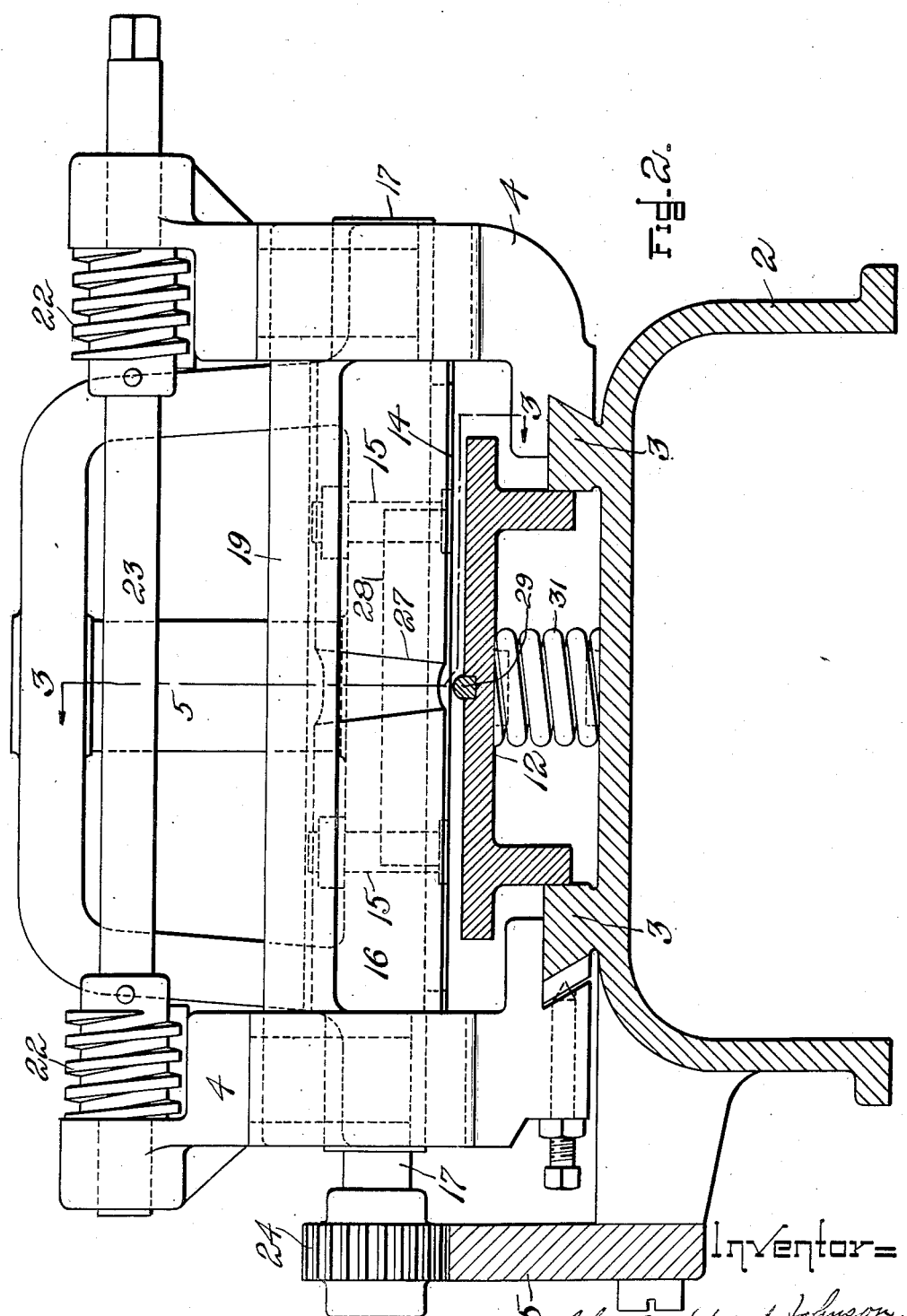

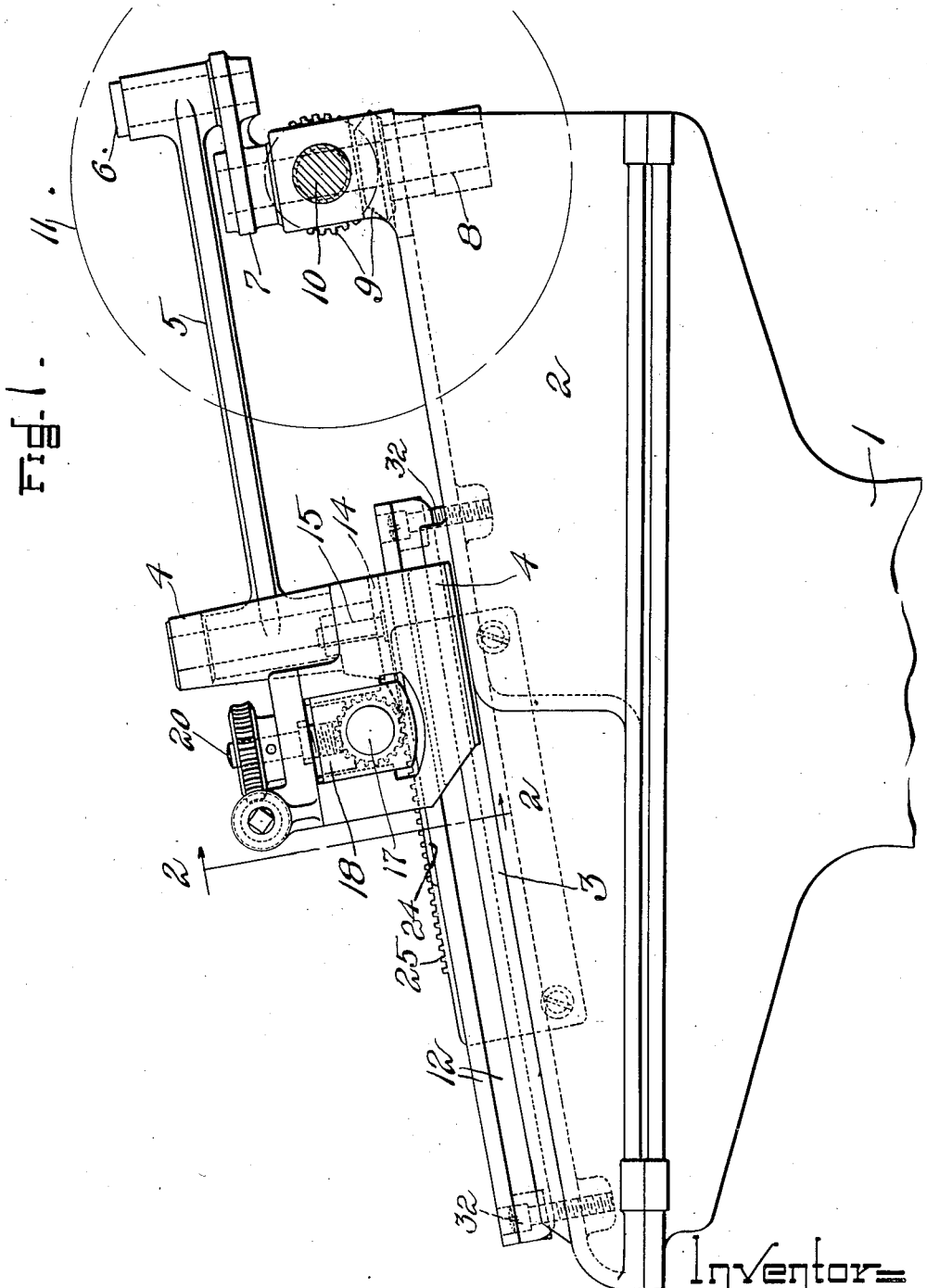

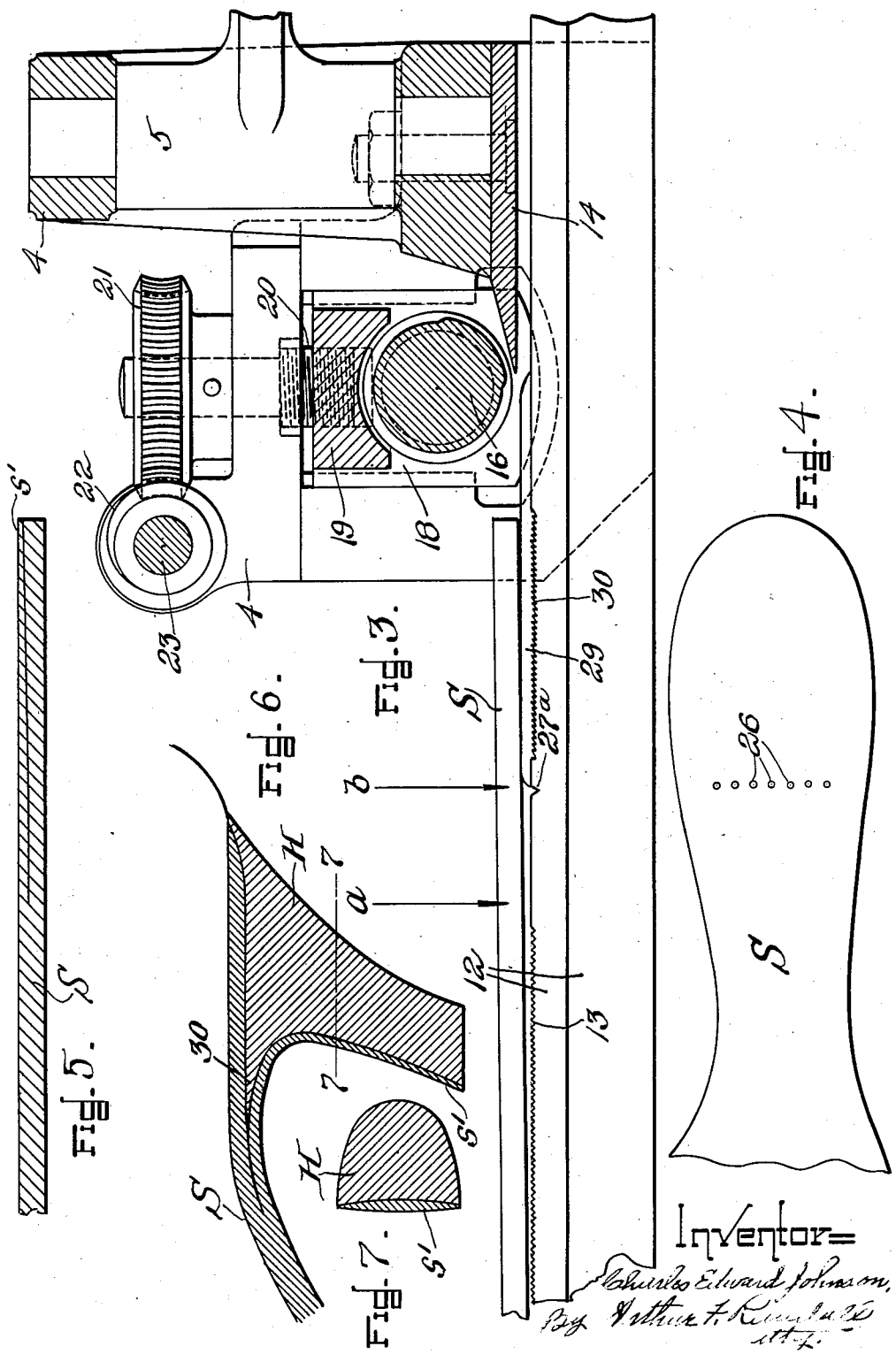

March 5, 1935.  C. E. JOHNSON  1,992,952
MACHINE FOR SPLITTING SOLES
Filed Sept. 14, 1931  4 Sheets-Sheet 4
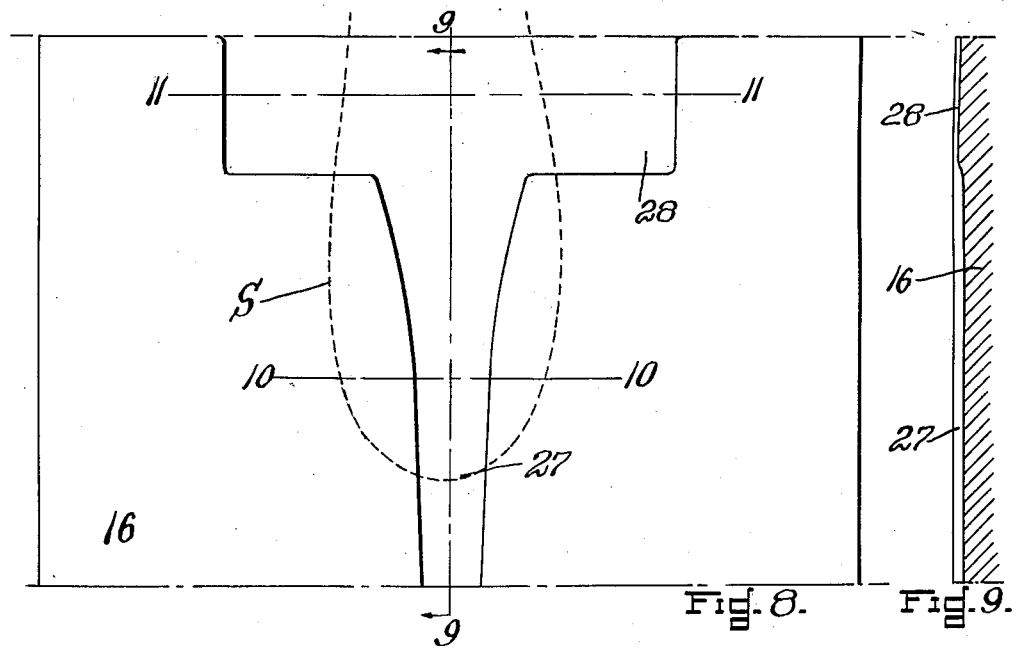
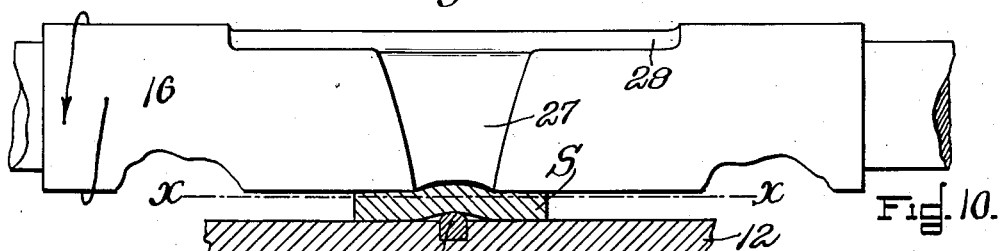
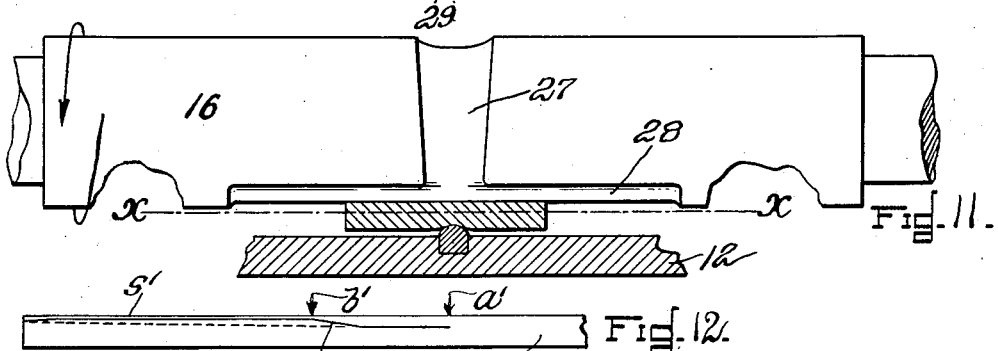

Patented Mar. 5, 1935

1,992,952

UNITED STATES PATENT OFFICE 1,992,952

MACHINE FOR SPLITTING SOLES

Charles Edward Johnson, Whitman, Mass., assignor, by mesne assignments, to United Shoe Machinery Corporation, Paterson, N. J., a corporation of New Jersey Application September 14, 1931, Serial No. 562,644

12 Claims. (Cl. 12—17)

My invention relates to the art of making boots and shoes and particularly to the production of soles for boots and shoes, the object of the invention being to provide an improved machine for splitting soles preparatory to their incorporation in boots and shoes.

In making women's shoes having wood heels, particularly high wood heels such as full Louis, half Louis, and the like, it has heretofore been common practice to split the heel portion of the sole longitudinally from the rear end thereof forwardly into the shank on a plane parallel with the tread side of the sole, and nearer said tread side than the top side, so as to provide a thin flap to cover the breast of the heel to which said flap is cemented.

This flap, as produced by sole splitting machines as heretofore constructed, was of uniform thickness throughout its extent, or at least throughout its width, and also comparatively thick in order that it might have the required strength and body. Therefore, in order to avoid unsightly and otherwise objectionable raw flap-edges at the opposite sides of the breast of the heel of the completed shoe, it has heretofore been desirable to bevel the marginal portions of the inner face of the flap along the opposite sides thereof before applying the flap to the heel. This beveling operation was effected manually by means of a hand knife while maintaining the flap bent forwardly and at rest on a hard flat surface, the hand knife being used to remove skivings from the opposite side marginal portions of the inner face of the flap so as to bevel the same. This manually effected skiving or beveling operation requires time in addition to that required for the splitting operation which was objectionable, and also requires the services of a skilled operator which increases the cost of the operation.

My invention provides a new sole-splitting machine having, as a distinguishing feature thereof, means for bending, or bowing, the heel or rear end portion of a sole transversely as said portion is split longitudinally by means of the knife of the machine which, as usual, is provided with a straight cutting edge, so that by a single cutting operation, the sole is split and provided with a breast covering flap whose opposite side marginal portions are thinner than its middle or intermediate portion.

Other features of my invention are hereinafter pointed out.

In the accompanying drawings:

Figure 1 is a side elevation of the upper portion of a sole-splitting machine constructed in accordance with my invention.

Figure 2 is a section on line 2—2 of Figure 1.

Figure 3 is a section on line 3—3 of Figure 2.

Figure 4 is a plan view of the rear end portion of a sole before it is split.

Figure 5 is a longitudinal sectional view of the portion of sole shown in Figure 4 after it has been split.

Figure 6 is a sectional view of the rear end portion of a shoe provided with a sole having a breast-covering flap applied to the heel of the shoe.

Figure 7 is a section on line 7—7 of Figure 6.

Figure 8 is a development of the abutment roll hereinafter described.

Figure 9 is another diagrammatic view illustrating the surface configuration of the roll on the line 9—9 of Figure 8.

Figures 10 and 11 are views illustrating the operation of my new machine.

Figure 12 is a side elevation of the rear end portion of a sole after it has been split by my new machine.

Figure 13 is a plan view of the portion of sole shown in Figure 12.

The illustrated embodiment of my invention comprises a pedestal 1 adapted to rest upon a floor and to the top of this pedestal is fastened a frame-section 2 having a top wall that is inclined toward the front of the machine. This top wall is provided with ways 3 upon which is slidably mounted a carriage or carrier 4.

Carriage 4 is connected by a link 5 with a wrist pin 6 carried by a quadrant or crank-arm 7 that is fixed in position upon the upper end of a vertical shaft 8 journaled in bearings provided on frame section 2. Shaft 8 is connected by gearing 9 with a horizontal shaft 10, also journaled in bearings on frame section 2.

It is usual to provide the shaft 10 with tight and loose pulleys that are indicated by the dot-and-dash line in Figure 1 and associated with these pulleys is a driving belt, not shown, that is controlled by a shipper mechanism that is operated to start and stop the shaft 10.

Adjustably mounted, as usual, upon the top of frame section 2, between the ways 3, is a work support or table 12 having a portion of its top surface provided with fine teeth or otherwise roughened as indicated at 13 and 30 in Fig. 3.

Directly above, and close to, the work support 12 is a knife blade 14 fastened by bolts 15, Figs. 1 and 2, to a cross-bar forming part of the carriage 4. Directly above the cutting edge of knife 14 is an abutment roll or matrix 16 fixedly mounted upon a shaft 17 journaled in boxes or bearings 18 mounted in ways provided on carriage 4 so that it can be adjusted toward and from the cutting edge of knife 14.

The boxes 18 are connected by a cross bar 19 and each box is formed at its top with a threaded hole that is occupied by a screw 20 having an upwardly extending stem, journaled in a bearing on carriage 4. At its upper end the stem of each screw 20 is provided with a worm wheel 21 that is in mesh with a worm 22 fast on a horizontal shaft 23 also journaled in bearings on carriage 4. At one end thereof the shaft 23 is made square in cross section, as shown, to adapt it to receive a wrench by means of which said shaft is turned thereby to rotate the screws 20 when it is desired to adjust the abutment roll 16 toward and from the cutting edge of knife blade 14.

At one end thereof the shaft 17 carries a pinion 24 meshing with a rack 25 that is fixed to one side of frame section 2. As usual in sole-splitting machines of this class, treadle mechanism, not shown, is provided which when operated, causes the wrist pin 6 to make one revolution around the axis of shaft 8 and stop, and during this movement, it acts through link 5 to slide carriage 4 toward the left, Fig. 1, and then back to its original position again.

A sole that is to be split is placed upon work support 12 with its flesh side lowermost and with its heel end adjacent abutment roll 16. When the sole is in proper position upon the work support 12, its forepart rests upon the roughened surface or teeth 13 with the median line of its heel part parallel with the ways 3.

After placing the sole in position upon support 12 and operating the foot treadle as described, the carriage 4 is given a reciprocatory movement during which the operator holds the forepart of the sole pressed firmly against the roughened surface 13.

The pitch diameter of the pinion 24 is the same as the outside diameter of roll 16 with the result that as the carriage is reciprocated, the abutment roll engages and rolls back and forth against the top side of the sole without slipping or sliding thereon and, with the assistance of work support 12, maintains the sole in proper position with relation to the knife blade 14 as the latter splits said sole.

As shown in Fig. 4, the topmost side of the sole S is made with a transverse row of faint marks 26 to be used as a guide in positioning the sole upon the work support 12 so as to determine or fix the length of the cut made by knife 14. When a sole is placed in a position upon work support 12, this row of marks 26 is positioned directly opposite an index mark or groove 27a provided on the top side of work support 12 thereby positioning the sole on the work support 12 so that the cut made by the knife 14 will terminate when the cutting edge of said knife reaches the point indicated by the arrow $a$ in Fig. 3.

It is a feature of my invention that the roll 16 is made with a relatively narrow circumferential groove 27 of a predetermined depth, Figs. 8 and 9, which communicates at its opposite ends with a relatively wide circumferential pocket or depression 28 that is of somewhat less depth than the groove 27.

The groove 27 is relatively narrow at one end thereof and gradually increases in width towards its opposite end.

Opposite this recessed portion of abutment roll 16, the work support 12 is made with a longitudinally disposed rib or fin 29 which co-operates with the opposite side walls of groove 27 to bow or bend the sole transversely as it is operated upon by knife 14 and while the latter is cutting through the sole to the point indicated by the arrow $b$ in Fig. 3 and the arrow $b'$ in Fig. 12, which point corresponds with the position of the front edge of lip 30, Fig. 6, of the heel H of the shoe to which the sole is applied.

Upon arrival of the cutting edge of the knife 14 at the point indicated by arrows $b$ and $b'$, the recess or pocket 28 comes into position opposite the sole and permits the latter to assume the flat shape illustrated in Fig. 11 while the cutting edge of the knife is traveling from point $b$, to point $a$, Fig. 3, which correspond to the points $b'$ and $a'$, respectively, of Fig. 12.

During the cutting stroke of knife 14 the heel part of the sole S is maintained in the position relatively to roll 16 that is indicated by dotted lines in Fig. 8 because of the rotary motion imparted to roll 16. It will therefore be clear that when the cutting edge of knife 14, starting at the heel of the sole, reaches the line 10—10 of Fig. 8, the sole will be held by rib 29 and the opposite side walls of groove 27 in the bent or bowed condition illustrated in Fig. 10.

It will also be clear that when the cutting edge of knife 14 is opposite the pocket 28 as indicated by the line 11—11 in Fig. 8, the sole will be held in the flat condition illustrated in Fig. 11.

In Figs. 10 and 11 the dot-and-dash lines $x$—$x$ represent the position of the cutting edge of knife 14 with relation to roll 16, and it will therefore be clear that while the knife is cutting the sole and transversing the groove 27, the flap $s'$, Figs. 12 and 13, is produced with its middle portion thicker than the opposite side marginal portions thereof, but after the cutting edge of the knife reaches the pocket 28, the sole is held flat so that a part of the flap $s'$ adjacent its junction with the shank of the sole is of uniform thickness throughout its width.

When the cutting edge of the knife reaches the junction of the groove 27 with the pocket 28, the sole, for a short distance in advance of said cutting edge, is slightly bowed but this bowed shape progressively and somewhat abruptly diminishes beyond said junction so that as the knife edge leaves said junction, short oblique slits or cuts 31, Fig. 12, are produced at opposite sides of the sole.

Upon completion of its cutting stroke the knife is immediately retracted and the split sole is removed.

As will be clear from the above description, a breast-covering flap is produced upon the sole whose longitudinal medial portion is of greater thickness than the opposite side marginal portions thereof. The relatively thick middle portion of the flap gives to the latter sufficient strength to withstand the endwise strains imposed upon the flap when the latter is being stretched into position against the breast of the heel as shown in Fig. 6, while the thin side marginal portions, even after they are trimmed to the shape of the heel, provide the flap with side edges which are of insignificant thickness as shown in Fig. 7.

In actual practice the machine constructed as herein described produces a flap whose thickness longitudinally at the middle thereof tapers approximately from the point $b'$, Fig. 12, toward its free end as indicated by the dotted line in said figure, so that the edge of the flap at the bottom of the heel H, Fig. 6, is not objectionably thick.

While the heel part of the sole that is bowed by the rib 29 is in engagement with roll 16 its opposite side portions are pressed by the latter firmly against the roughened or corrugated portions 30 of work rest 12, said corrugations preferably being provided immediately adjacent and at opposite sides of rib 29. In this way the heel portion is prevented from slipping on the work rest.

Sole splitting machines as heretofore constructed have the work rest 12 yieldingly supported by a plurality of springs interposed between said work rest and the frame section 2. One of these springs is shown at 31 in Fig. 2. It is also customary to provide screws 32, or other equivalent means, for limiting the upward movement of work rest 12 under the influence of the springs 31 and also for holding the work rest 12 against endwise movement relatively to frame section 2.

The relatively thick medial portion of the flap that is produced by this machine is that portion of the flap that is between the dotted lines 33 of Fig. 13.

The practice, heretofore, of first producing the flap of uniform thickness throughout and thereafter skiving its opposite side portions was also objectionable for the reason that in order to effect the skiving operations it was necessary to bend the flap very sharply at its junction with the sole in order to have access to the inner face of the flap. Many shoes are made with soles of cheap material so that in practice the flaps are frequently broken during this bending operation which resulted in wastage.

It was also an objectionable fact accompanying the old mode of procedure that in order to render the flap pliable so that it could be bent back, even in the case of soles made from the best of materials, it was the practice to temper the same by wetting the sole so that the flap would be rendered flexible and bendable. The cost of production of shoes is of course proportional to the time consumed in making them and therefore, in order to reduce this time to a minimum, it has been the practice to apply the cement to the flap as soon, after skiving, as possible, and in most cases this was done before the leather sole was dried with the result that the cement would not adhere thereto and the flap would not be securely fastened in its final position upon the shoe.

What I claim is:

1. A machine for splitting soles having, in combination, a work support for holding an unattached sole, a knife support, a knife mounted on said knife support and having an elongated cutting edge, means for moving said two supports relatively back and forth to cause said knife to split the heel portion of the sole transversely from its rear end forwardly into its shank portion, and an abutment alongside of the cutting edge of said knife, said abutment and said work support being constructed and arranged to cause the lateral marginal portions of the heel end of the sole to be disposed in substantially parallel relation to the cutting edge of the knife and also to cause the central portion of the sole to be bent transversely of said edge during the sole splitting operation thereby to produce a heel-breast covering flap having upon the inner side of its breast-covering rear end portion a narrow relatively thick longitudinal rib and formed at each side of said rib with a relatively thin side marginal portion whose inner and outer faces are approximately parallel both longitudinally and transversely.

2. A machine for splitting soles having, in combination, a work support for holding a normally flat unattached sole, a knife support, a straight edged knife mounted on said knife support, means for relatively reciprocating said supports to cause said knife to split the heel portion of the sole transversely from its rear end forwardly into its shank portion, and a rotatable abutment alongside of the cutting edge of said knife, said abutment and said work support being constructed and arranged to cause the lateral margins of the sole to be disposed in substantially parallel relation to the cutting edge of the knife and also to cause the central portion of the sole to be bent at a varying angle transversely of said edge during the sole splitting operation thereby to produce a breast-covering flap having upon the inner side of its breast covering rear end portion a narrow relatively thick longitudinal rib of varying width and formed at each side of said rib with a relatively thin side marginal portion whose inner and outer faces are approximately parallel both longitudinally and transversely.

3. A machine for splitting soles having, in combination, a work support made with an upstanding longitudinal sole-bending rib, a knife support, a straight edged knife mounted on said knife support, means for reciprocating said knife support to cause said knife to split the heel portion of a sole longitudinally, and an abutment roll mounted on said knife support said roll being formed with a circumferential groove whose opposite side walls co-operate with said rib to bend the sole transversely as it is split by said knife thereby to produce by one operation a breast-covering flap whose opposite side marginal portions are thinner than the intermediate portion of said flap that is between said side marginal portions.

4. A machine for splitting soles having, in combination, a work support made with an upstanding longitudinal sole-bending rib, a knife support, a straight edged knife mounted on said knife support, means for reciprocating said knife support to cause said knife to split the heel portion of a sole longitudinally, and an abutment roll mounted on said knife support made with a circumferential groove whose opposite side walls co-operate with said rib to bend the sole transversely as it is split by said knife thereby to produce by one operation a breast-covering flap whose opposite side marginal portions are thinner than the intermediate portion of said flap that is between said side marginal portions, and said abutment roll being also made with a recess that is wider than the sole and with which one end of said groove communicates.

5. A machine for splitting soles, having, in combination, a work support made with an upstanding longitudinal sole-bending rib, a knife support, a straight edged knife mounted on said knife support, means for reciprocating said knife support to cause said knife to split the heel portion of a sole longitudinally, an abutment roll rotatably mounted on said knife support alongside of the cutting edge of said knife, said roll being made with a circumferential groove whose opposite side walls co-operate with said rib to bend the sole transversely as it is split by said knife and means for rotating said abutment roll to cause the latter to roll upon said sole as said knife support is reciprocated.

6. A machine for splitting soles having, in combination, a work support made with an upstanding longitudinal sole-bending rib, a reciprocatory knife support, a straight edged knife mounted on said knife support, means for reciprocating said knife support to cause said knife to split the heel portion of a sole longitudinally, an abutment roll rotatably mounted on said knife support alongside the cutting edge of said knife, said abutment roll being formed with a circumferential groove whose opposite side walls co-operate with said rib to bend the sole transversely as it is split by said knife, journal boxes for said abutment roll, said journal boxes being mounted on said knife support so that they are adjustable toward and from said knife, and means for fixing said journal boxes in adjusted position.

7. A trimming machine having, in combination, a table for supporting a sole, resilient means for supporting the table, a carrier movable in a predetermined path along the table, a knife secured to the carrier, a matrix mounted for movement with the carrier and also movable relatively thereto, said matrix being provided with a sole-engaging face having a recess different portions of which have different widths constructed and arranged for cooperation with the table to distort a sole positioned upon the table laterally as the carrier moves along the table thereby to cause the knife to split from the sole a heel-breast covering flap the inner face of which is provided with a median rib, means for moving the matrix relatively to the carrier during the splitting operation to force against the sole portions of the recess having different widths thereby varying the shape of the rib along different portions of its length, and means for moving the carrier along the table.

8. A trimming machine having, in combination, a table provided with a plurality of projecting members for supporting a sole, a carrier, said table and said carrier being mounted for relative movement, a knife secured to the carrier, a matrix mounted upon the carrier and having a sole-engaging portion which includes a cylindrical face mounted for movement about an axis with respect to the carrier and provided with a recess of non-uniform width, means for effecting relative translatory movement of the carrier and the table to cause a sole positioned upon the table to be progressively distorted between the projecting members of the table and the sole-engaging portion of the matrix and to cause the sole and the knife to be forced together while the sole is distorted thereby to split from the sole a heel-breast covering flap the inner side of which is provided with a longitudinal median rib, and means for positively rotating the matrix relatively to the knife during the relative movement of the carrier and the table for forcing different portions of the recess against the sole during the splitting operation thereby to vary the width of the rib.

9. A trimming machine having, in combination, a support for a sole, a carrier mounted for movement across the support, a knife secured to the carrier and provided with a straight cutting edge, a matrix mounted for pivotal movement in the carrier and including a pair of cylindrical surfaces arranged in parallel relation with respect to said cutting edge and having a cavity of non-uniform width interposed between said cylindrical surfaces, means for urging the support with yielding pressure toward the matrix, means for moving the carrier over the support to split a heel-breast covering flap from the sole, and means for rotating the matrix relatively to the knife as the carrier moves over the support to cause the support progressively to force the median portion of the sole during the splitting operation into the cavity as the lateral portions of the flap are forced against the cylindrical surfaces of the matrix thereby to provide a flap the inner face of which has a convex rib of non-uniform width extending lengthwise of the flap and the lateral portions of which are of uniform thickness throughout substantially their extent.

10. A trimming machine having, in combination, a support for a sole, a carrier, a matrix rotatably mounted in the carrier and provided with a pair of cylindrical surfaces spaced by a cavity which varies in width as it extends around the cylindrical surfaces, said support and said carrier being mounted for relative translatory movement, a knife secured to the carrier and having a straight cutting edge positioned adjacent to and arranged in parallel relation to the cylindrical surfaces, means for effecting relative movement of the support on one hand and the carrier, the matrix and the knife on the other hand to split a heel-breast covering flap from the sole, said support being constructed and arranged yieldingly to force the margins of the sole against the cylindrical surface and the central part of the sole into the cavity thereby to flex the sole transversely to form a flap having a rib extending heightwise along its inner median face and having thin marginal portions which are of substantially uniform thickness, and means for positively rotating the matrix during said translatory movement to present different portions of the recess to the sole during the splitting operation thereby to vary the width of the rib along different lengthwise portions of the flap.

11. A trimming machine having, in combination, a table, a carrier mounted for movement across the table, a matrix roll mounted for movement with the carrier and provided with a cylindrical surface having a recess of non-uniform width formed therein, a knife secured to the carrier and provided with a cutting edge disposed in parallel relation to the cylindrical surface, and means for moving the carrier relatively to the table to split a heel breast covering flap from a sole positioned upon the table, said table being constructed and arranged for cooperation with the cylindrical surface of the matrix roll to maintain the marginal portions of the flap in parallel relation with respect to the cutting edge of the knife during the splitting operation thereby to provide a flap the marginal portions of which are of uniform thickness throughout substantially their whole extent and said recess and said table being constructed and arranged to flex the central portion of the flap during the splitting operation thereby to form on the inner side of the flap a rib which extends substantially lengthwise of the flap, the matrix roll being mounted for movement relatively to the knife during the flap splitting operation to bring progressively into engagement with the sole portions of the recess having different widths thereby varying the width of the rib in accordance with the shape of the recess.

12. A trimming machine having, in combination, a yielding support, a carrier provided with guideways, means for causing relative translatory movement of the support and the carrier, a pair of bearings mounted for adustment toward and away from the support along the respective guideways, a matrix mounted in the bearings, said matrix being provided with a recess and having a pair of cylindrical faces positioned at opposite sides of the recess, a knife having a cutting edge disposed in substantially parallel relation to the cylindrical faces, means for moving the carrier along the support for causing the cylindrical faces to cooperate with a portion of the support to arrange the margins of the sole in parallel relation with the cutting edge of the knife and for causing the recess to cooperate with another portion of the support for bending a median portion of the sole with respect to the cutting edge as the sole is fed progressively against the knife, and means for adjusting the bearings toward and away from the support properly to aline the matrix with respect to the support.

CHARLES EDWARD JOHNSON.